Oct. 27, 1942.        A. F. TAMS        2,300,323
LATCHING MECHANISM
Filed Jan. 31, 1941        2 Sheets-Sheet 1
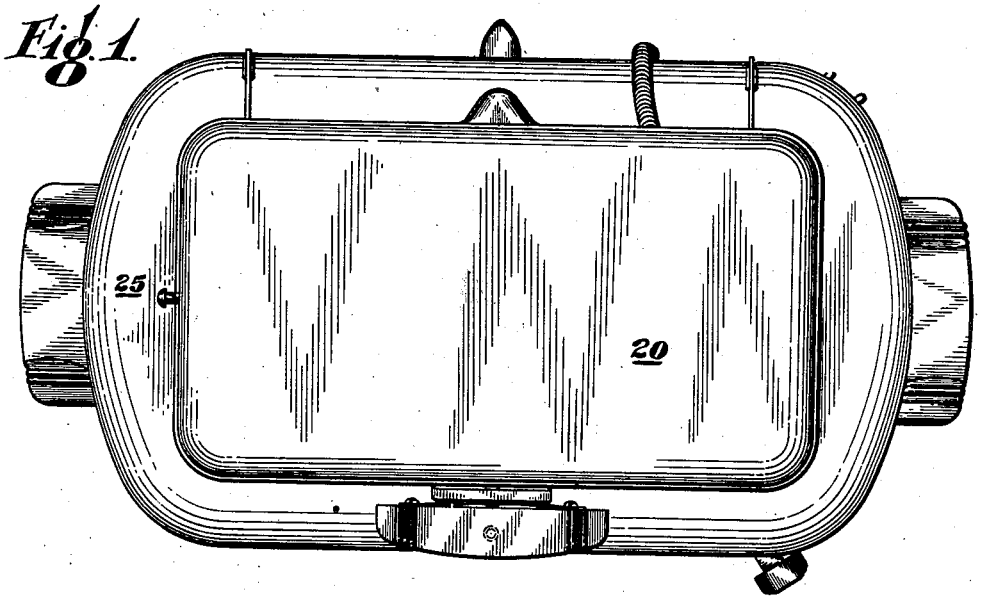
Fig. 1.
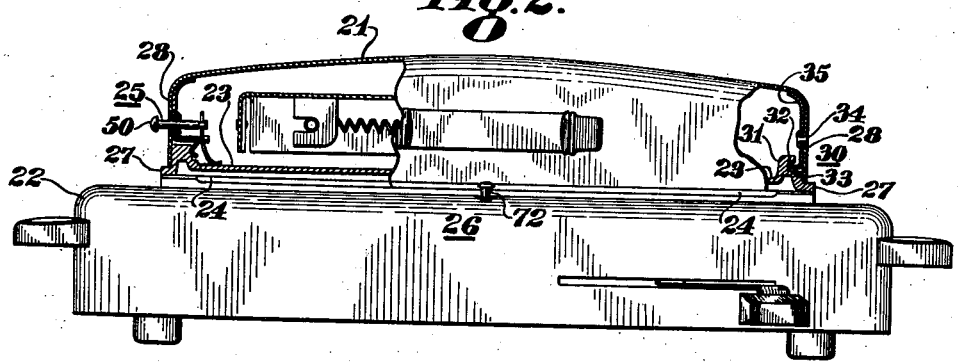
Fig. 2.
Fig. 3.   Fig. 4.   Fig. 5.
INVENTOR.
BY Austin F. Tams
Woodling and Krost attys
ATTORNEY.

Oct. 27, 1942.　　　A. F. TAMS　　　2,300,323
LATCHING MECHANISM
Filed Jan. 31, 1941　　　2 Sheets-Sheet 2
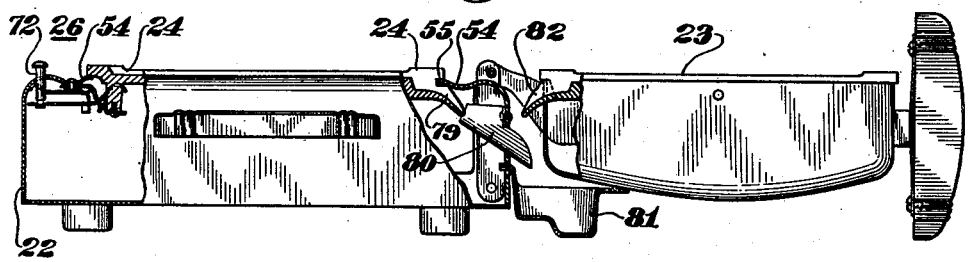
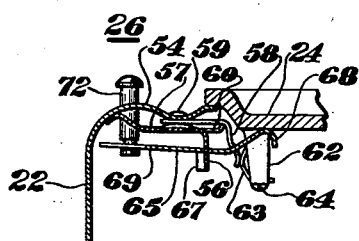
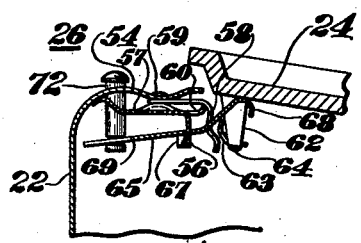
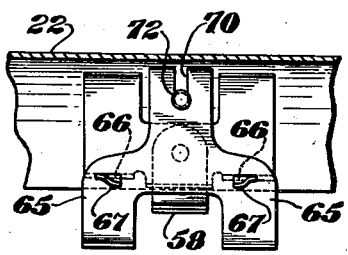
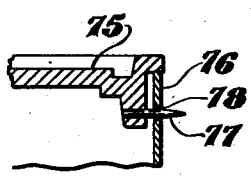
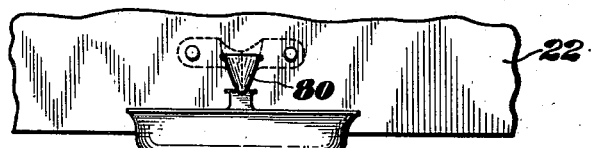
INVENTOR.
Austin F. Tams
BY Hoodling and Krost, atty Patented Oct. 27, 1942

2,300,323

UNITED STATES PATENT OFFICE 2,300,323

LATCHING MECHANISM

Austin F. Tams, Cleveland, Ohio, assignor to Dominion Electrical Manufacturing, Inc., a corporation of Ohio Application January 31, 1941, Serial No. 376,825

11 Claims. (Cl. 53—5)

My invention relates in general to a latch mechanism and more particularly to a latch mechanism for releasably fastening a plate to an appliance, such for example, as sandwich toasters and waffle irons.

My latching mechanism is particularly adaptable to an electrical appliance having exchangeable grill plate which may be conveniently and readily exchanged to convert a sandwich toaster into a waffle iron and vice versa.

An object of my invention is the provision of a latching mechanism which may be conveniently operated externally of the casing of the electrical appliance.

Another object of my invention is the provision of a latching mechanism which functions when unlatched to disengage the grill plate from the casing of the appliance, thereby conveniently facilitating the exchange of grill plates.

Another object of my invention is the provision of a latching mechanism which functions when in the latched position to secure the grill plate in the casing of the electrical appliance and which functions in the unlatched position to forceably separate or disengage the grill plate from the appliance casing.

Another object of my invention is the provision of a latching mechanism which is simple in construction and which is easy to operate.

Other objects and a fuller understanding of my invention may be had by referring to the following description and claims, taken in conjunction with the accompanying drawings, in which:

Figure 1 represents a plan view of an electrical appliance embodying the features of my invention;

Figure 2 is a side view of the appliance shown in Figure 1 with certain parts shown in section to illustrate the features of my latching mechanism;

Figure 3 is an enlarged cross-sectional view of my latching mechanism for the upper part of the electrical appliance with the upper part shown in its open position and looking at the view from the reverse side as that shown in Figure 2;

Figure 4 is a view similar to Figure 3 and shows the latching mechanism in its unlatched position;

Figure 5 is a side view of Figure 3 looking from right to left;

Figure 6 is a side view of my appliance with the upper part of the appliance shown in its open position and showing in cross-section features of my invention;

Figure 7 is an enlarged cross-sectional view of the left-hand end of the Figure 6 showing my latching mechanism for the lower part of the electrical appliance;

Figure 8 is a view similar to Figure 7 and shows the latching mechanism in its unlatched position and functioning to separate or disengage the grill plate from the appliance casing;

Figure 9 is a view of Figure 7 looking upwardly;

Figure 10 is a modified arrangment of an interfitting relation between the grill plate and the casing of the electrical appliance; and Figure 11 is a rear view of the lower part of the electrical appliance showing my drip cup arrangement.

With reference to the drawings, my latching mechanism is particularly adaptable to an electrical appliance indicated generally by the reference character 20 but it is to be understood that my invention may apply to electrical appliances or other devices of a different design and arrangement. As illustrated, the electrical appliance 20 has an upper part 21 and a lower part 22 which are hingedly connected to each other so that the two parts may be swung open as shown in Figure 6. Both the upper part 21 and the lower part 22 are provided with exchangeable grill plates to convert the electrical appliance into a sandwich toaster or into a waffle iron, or vice versa. The exchangeable or replaceable grill plate for the upper part 21 of the electrical appliance is indicated by the reference character 23 and the exchangeable or replaceable grill plate for the lower part of the electrical appliance is indicated by the reference character 24. Both the upper part 21 and the lower part 22 of the electrical appliance are provided with a latching mechanism, the latching mechanism for the upper part 21 being indicated generally by the reference character 25 and the latching mechanism for the lower part being indicated generally by the reference character 26. The latching mechanism 25 for the upper part of the appliance will be described first, see Figures 2, 3, 4 and 5.

The replaceable grill plate 23 for the upper part 21 of the appliance is provided with a peripheral shoulder 27 which engages the peripheral edge of the side wall 28 of the upper part of the appliance. As illustrated in Figure 2, the replaceable grill plate 23 is releasably held in the upper part 21 of the appliance at two locations; namely, by the latching mechanism 25 upon the left-hand end and by an interfitting arrangement indicated by the reference character 30 upon the right-hand end. The interfitting arrangement 30 comprises a post 31 having a slot 32 therein integrally formed with the replaceable grill plate 23, and an inwardly extending projection 33 fitting into the slot 32. The inwardly extending projection 33 is made by bending the lower end of a small piece of sheet metal substantially at right angles to the remaining part 35 which is suitably connected to the inside wall 28 of the upper part of the appliance by a rivet 34 or by any other suitable manner. In mounting the replaceable grille plate 23 in the upper part 21 of the appliance, the user merely guides the right-hand end of the grill plate until the slot 32 fits over the inwardly extending projection 33. Upon the making of the interfitting engagement between the slot 32 and the inwardly extending projection 33, the user then depresses the left-hand end of the replaceable grill plate 23 into locking engagement with the latching mechanism 25, which completes the fastening of the grill plate 23 in the upper part 21 of the appliance.

With reference to Figures 3, 4 and 5 the latching mechanism 25 comprises an inwardly extending support 38, a resilient latch 40, a lever 44, and a manually operable push button 50 for operating the lever 44. The inwardly extending support 38 may be made of a piece of sheet metal which is bent substantially at right angles to an anchoring part 39 which fits against the inside wall 28 of the upper part 21 of the appliance. The free or latching end of the resilient latch 40 is adapted to complementarily fit into a notch 43 provided in a post 42 formed integrally with the replaceable grill plate 23. The remaining part of the resilient latch 40, as shown in Figures 3, 4 and 5, passes down through an opening in the inwardly extending support 38 and then is bent at a right angle and fits underneath of the inwardly extending support 38 until it engages the anchoring part 39 of the inwardly extending support 38. After the bend, the resilient latch 40 fits against the anchoring part 39, and both are anchored to the side wall 28 of the upper part 21 of the appliance by means of hollow riveting material 41 which is made available when the opening in the side wall 38 is pierced for the reception of the manually operable push button 50. The riveting securely holds the anchored parts of the resilient latch 40 and the inwardly extending support 38 in place.

As illustrated in Figure 5, the upper end 47 of the lever 44 is constructed of two spaced parts and each has a slot 45 which fits over spaced tabs 46 upon the inwardly extending support 38. The tabs 46 are bent as shown in Figure 5 which securely holds the lever 44 upon the inwardly extending support 38. The arrangement of the slots 45 and the tabs 46 pivotally connect the lever 44 intermediate its end to the said inwardly extending support. The lower end 48 of the lever 44 is provided with a slot 49 which receives a reduced section 51 upon the right-hand end of the manually operable push button 50.

In the latched position as shown in Figure 3, the resilient latch 40 complementarily engages the notch 43 in the post 42 of the replaceable grill plate and accordingly resiliently secures the grill plate within the upper part 21 of the appliance. In removing the grill plate it is only necessary for the user to push the manually operable push button 50 inwardly, in which event the upper end 47 of the lever 44 engages the grill plate 23 and forceably separates the latching engagement between the resilient latch 40 and the notch 43 in the post 42 of the grill plate, see Figure 4. Therefore, my latching mechanism functions when in the latched position to secure the grill plate in the casing of the electrical appliance and functions in the unlatched position to forceably separate or disengage the grill plate from the appliance casing.

In Figures 6, 7, 8 and 9 I illustrate the manner for releasably holding the exchangeable grill plate 24 in the lower part 22 of the appliance. The lower part 22 of the appliance is provided with a peripheral marginal edge portion 54 upon which the peripheral edge portion of the replaceable grill plate 24 engages. As illustrated in Figure 6, the right-hand edge of the grill plate 24 is provided with a slot 55 which fits around or engages the edge of the peripheral marginal edge portion 54 of the appliance casing. The interfitting engagement between the slot 55 and the edge of the casing holds the right-hand edge of the grill plate 24 within the casing. When mounting the replaceable or exchangeable grill plate 24 in the lower half of the casing, the operator guides the grill plate until the slot 55 interfits with the edge of the casing and then the operator or user depresses the left-hand edge of the grill plate into engagement with the latching mechanism 26 upon the left-hand edge of the grill plate as shown in Figure 6. With reference to the enlarged views of my latching mechanism 26 as shown in Figures 7, 8 and 9, it comprises a downwardly extending support 56, a resilient latch 58, a lever 65, and a manually operable push button 72. The downwardly extending support 56 is made from a piece of sheet metal and is bent substantially at right angle to an anchoring part 57 which fits against the underneath side of the peripheral marginal edge portion 54 of the casing. The fixed end of the resilient latch 58 is positioned between the anchoring part 57 and the underneath side of the peripheral marginal edge portion 54 of the casing. As illustrated in Figures 7 and 8, both the downwardly extending support 56 and the fixed end of the resilient latch 58 are riveted by means of a rivet 59 to the casing. The anchoring part 57 of the support 56 is provided with a tab 60 which extends to the right and supports the resilient latch 58 to insure proper functioning of the resilient latch 58. The free or downwardly extending end of the resilient latch 58 is arranged to complementarily engage a fixed latch member 63 which may be suitably fastened by means of a screw 64 or any other suitable means to a post 62 formed integrally with the exchangeable grill plate 24. The latching engagement between the resilient latch 58 and the fixed latch member 63 is effected by merely depressing the left-hand edge of the grill plate 24 downwardly within the lower part of the appliance. The lever 65 is employed to forceably separate the latching engagement between the resilient latch 58 and the fixed latch member 63 upon removing the grill plate from the casing of the appliance. As shown in Figure 9, the engaging end 68 of the lever 65 is constructed in two spaced parts and each has a slot 66 which fits over two spaced tabs 67 upon the downwardly extending support 56. The ends of the tabs 67 are bent to securely hold the lever 65 upon the downwardly extending support 56. The arrangement of the slots 66 and the tabs 67 pivotally connect the lever 65 intermediate its end to the downwardly extending support 56. The left-hand end 69 of the lever 65 as shown in Figures 7, 8 and 9 is provided with a slot 70 to receive a reduced section 71 upon the end of the manually operable push button 72. In removing the exchangeable grill plate 24 from the casing, it is only necessary for the user or operator to depress the manually operable push button 72 downwardly in which event the engaging end 68 of the lever forceably separates the latching engagement between the resilient latch 58 and the fixed latch member 63. In the unlatched position as shown in Figure 8, the replaceable grill plate 24 is elevated from the peripheral marginal edge portion 54 of the casing so that it is convenient for the user or operator to remove the grill plate. Therefore, the latching mechanism 26 for the lower half 22 of the appliance functions when in the latched position to secure the grill plate in the casing of the electrical appliance and functions in the unlatched position to forceably separate or disengage the grill plate from the appliance casing.

In Figure 10 I show a modification of the arrangement of the interfitting connection between the grill plate and the casing. The grill plate is indicated by the reference character 75 and the casing is represented by the reference character 76 in which construction a pin 77 fitting into an opening 78 of the casing provides for holding one edge of the grill plate in the casing of the appliance. The pin 77 is anchored to the grill plate. The arrangement shown in Figure 10 may be substituted for the interfitting arrangement 30 as shown in Figure 2 or the interfitting arrangement between the slot 55 and the peripheral marginal edge portion 54 as shown in Figure 6.

As shown in Figures 6 and 11 a drip cup 81 is provided for both the lower and the upper parts of the appliance. A drip lip 82 for the replaceable grill plate 23 may be integrally constructed with the plate and is arranged to fit into a cut out portion in the wall of the upper part of the appliance and direct the dripping to the drip cup 81. The dripping arrangement for the replaceable grill 24 for the lower part of the appliance is different from that for the replaceable grill 23 for the upper part of the appliance. The reason for this difference is that the lower part of the appliance is provided with the peripheral marginal edge portion 54. As illustrated in Figures 6 and 11, the dripping arrangement for the replaceable grill 24 comprises a drip lip 79 and a drip trough 80, the latter of which being riveted or otherwise suitably connected to the said wall of the casing. The drip lip 79 may be formed integrally with the replaceable grill plate 24 and conveys the dripping from the grill plate underneath of the peripheral marginal edge portion 54 through the drip trough 80. As illustrated in Figure 6, the slots 55 are cut in the upper side edges of the drip lip 79, thus producing two spaced slots 55 for engaging the peripheral marginal edge portion 54 of the appliance casing. In mounting the grill plate 24 in the lower part of the appliance casing, the drip lip 79 is guided within the drip trough 80 at the same time that the slots 55 are arranged to fit over and engage the peripheral marginal edge portion of the appliance.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. Mechanism for releasably fastening a removable grill plate in an opening of an appliance casing comprising, in combination, latch means mounted within the casing and making engagement between the plate and the casing to hold the plate in the casing, and manually operable releasing means extending from the inside of the casing to the outside thereof for releasing the said latch engagement and urging the plate out of the opening, said releasing means when manually operated forcibly engaging the plate for separating the latch engagement and urging the plate out of the casing, said releasing means being mounted on the casing and disconnected from the plate to readily facilitate the removal of the unlatched plate from the casing, said plate fitting relatively close in the opening of the appliance for preventing lateral relative movement therebetween to effect the latch engagement.

2. Mechanism for releasably fastening a removable grill plate in an opening of an appliance casing comprising, in combination, resilient latch means mounted within the casing and making engagement between the plate and the casing to hold the plate in the casing, and manually operable releasing means extending from the inside of the casing to the outside thereof for releasing the said latch engagement and urging the plate out of the opening, said releasing means when manually operated forcibly engaging the plate for separating the latch engagement and urging the plate out of the casing, said releasing means being mounted on the casing and disconnected from the plate to readily facilitate the removal of the unlatched plate from the casing, said plate fitting relatively close in the opening of the appliance for preventing lateral relative movement therebetween to effect the latch engagement.

3. Mechanism for releasably fastening a removable grill plate in an opening of an appliance casing comprising, in combination, resilient latch means mounted within the casing and making engagement between the plate and the casing to hold the plate in the casing, and manually operable releasing means extending from the inside of the casing to the outside thereof for forceably separating the said latch engagement and urging the plate out of the opening, said releasing means including a push button element slidably mounted in the casing and a lever actuated thereby, said push button element when manually depressed forcibly urging the lever against the plate for separating the latch engagement and urging the plate out of the casing, said lever being mounted on the casing and disconnected from the plate to readily facilitate the removal of the unlatched plate from the casing.

4. Mechanism for releasably fastening a removable grill plate in an opening of an appliance casing comprising, in combination, interfitting means making engagement between the plate and the casing, latch means mounted within the casing and spaced from the interfitting means for making a latch engagement between the plate and the casing, and manually operable releasing means extending from the inside of the casing to the outside thereof for releasing the said latch engagement and urging the plate out of the opening, said releasing means including a push button element slidably mounted in the casing and a lever actuated thereby, said push button element when manually depressed forcibly urging the lever against the plate for separating the latch engagement and urging the plate out of the casing, said lever being mounted on the casing and disconnected from the plate to readily facilitate the removal of the unlatched plate from the casing.

5. Mechanism for releasably fastening a removable grill plate in an opening of an appliance casing comprising, in combination, latch means mounted within the casing and making engagement between the plate and the casing to hold the plate in the casing, said latch means comprising two parts mounted respectively upon the casing and the plate, one of said parts comprising a resilient member and the other of said parts comprising a fixed member, said parts making a latching engagement with each other, said plate fitting relatively close in the opening of the appliance for preventing lateral relative movement therebetween to hold the latch part on the plate in substantially a fixed position relative to the latch part on the casing, lever means mounted intermediate its ends on the casing, one end of said lever means being disposed upon actuation to engage the plate for forcibly separating the latch engagement and urging the plate out of the opening, and manually operable means for actuating the other end of the lever means, said manually operable means extending through the casing for external operation, said lever being disconnected from the plate to readily facilitate the removal of the unlatched plate from the casing.

6. Mechanism for releasably fastening a removable grill plate in an opening of an appliance casing comprising, in combination, latch means mounted within the casing and making engagement between the plate and the casing to hold the plate in the casing, said latch means comprising two parts mounted respectively upon the casing and the plate, one of said parts comprising a resilient member and the other of said parts comprising a fixed member, said parts making a latching engagement with each other, said plate fitting relatively close in the opening of the appliance for preventing lateral relative movement therebetween to hold the latch part on the plate in substantially a fixed position relative to the latch part on the casing, lever means mounted on the casing and disposed upon actuation to engage the plate for forceably separating the said latch engagement and urging the plate out of the opening, and manually operable means for actuating the lever means, said manually operable means extending through the casing for external operation, said lever being disconnected from the plate to readily facilitate the removal of the unlatched plate from the casing.

7. Mechanism for releasably fastening a removable grill plate in an opening of an appliance casing comprising, in combination, latch means mounted in the casing and making engagement between the plate and the casing to hold the plate in the casing, said latch comprising two parts, one of said parts comprising a resilient member and the other of said parts comprising a fixed member, support means, lever means mounted intermediate its ends upon the support means, anchoring means for anchoring the support means and the said resilient means to the casing, means for mounting the fixed member to the plate, said plate fitting relatively close in the opening of the appliance for preventing lateral relative movement therebetween to hold the fixed member of the latch in substantially a fixed position relative to the resilient member of the latch, and manually operable means mounted on the casing for actuating one end of the lever means, said manually operable means extending through the casing for manual operation, said other end of the lever means upon actuation being disposed to engage the plate for forceably separating the latch engagement, said lever being disconnected from the plate to readily facilitate the removal of the unlatched plate from the casing.

8. Mechanism for releasably fastening a removable grill plate in an opening of an appliance casing having a peripheral marginal edge portion in substantially the same plane as the plate comprising, in combination, mechanism for releasably fastening a removable grill plate to an appliance casing comprising, in combination, latch means mounted in the casing and making engagement between the plate and the casing to hold the plate in the casing, said latch comprising two parts, one of said parts comprising a resilient member and the other of said parts comprising a fixed member, support means, lever means mounted intermediate its ends upon the support means, anchoring means for anchoring the support means and the said resilient means to the peripheral marginal edge portion of the casing, said plate fitting relatively close in the opening of the appliance for preventing lateral relative movement therebetween to hold the fixed member of the latch in substantially a fixed position relative to the resilient member of the latch, means for mounting the fixed member to the plate, and manually operable means mounted on the casing for actuating one end of the lever means, said manually operable means extending through the peripheral marginal edge portion of the casing for manual operation, said other end of the lever means upon actuation being disposed to engage the plate for forceably separating the latch engagement and urging the plate out of the opening, said lever being disconnected from the plate to readily facilitate the removal of the unlatched plate from the casing.

9. Mechanism for releasably fastening a removable grill plate in an opening of an appliance casing having side wall means defining an edge upon which the plate engages comprising, in combination, mechanism for releasably fastening a removable grill plate to an appliance casing comprising, in combination, latch means mounted in the casing and making engagement between the plate and the casing to hold the plate in the casing, said latch comprising two parts, one of said parts comprising a resilient member and the other of said parts comprising a fixed member, support means, lever means mounted intermediate its ends upon the support means, anchoring means for anchoring the support means and the said resilient means to the side wall means of the casing, means for mounting the fixed member to the plate, said plate fitting relatively close in the opening of the appliance for preventing lateral relative movement therebetween to hold the fixed member of the latch in substantially a fixed position relative to the resilient member of the latch, and manually operable means mounted on the casing for actuating one end of the lever means, said manually operable means extending through the side wall means of the casing for manual operation, said other end of the lever means upon actuation being disposed to engage the plate for forceably separating the latch engagement and urging the plate out of the opening, said lever being disconnected from the plate to readily facilitate the removal of the unlatched plate from the casing.

10. Mechanism for releasably fastening a removable grill plate in an opening of an appliance casing comprising, in combination, latch means mounted within the casing and making latch engagement between the plate and casing to hold the plate in the casing, said latch means comprising two parts, one of said parts being connected to the casing and having a latch portion extending therefrom within the casing and the other of said parts being connected to the plate and having a latch portion extending therefrom within the casing and engaging the latch portion of said one of said parts to effect said latch engagement, said plate fitting relatively close in the opening of the appliance for preventing lateral relative movement therebetween to hold the latch portion on the plate in substantially a fixed position relative to the latch portion of the casing, and manually operable releasing means extending from the inside of the casing to the outside thereof for releasing the said latch engagement and urging the plate out of the opening, said releasing means when manually operated forcibly engaging the plate for separating the latch engagement and urging the plate out of the casing, said releasing means being mounted on the casing and disconnected from the plate to readily facilitate the removal of the unlatched plate from the casing.

11. Mechanism for releasably fastening a removable grill plate in an opening of an appliance casing comprising, in combination, latch means mounted within the casing and making latch engagement between the plate and casing to hold the plate in the casing, said latch means comprising two parts, one of said parts being connected to the casing and having a latch portion extending therefrom within the casing and the other of said parts being integrally connected to the plate and having a latch portion extending therefrom within the casing and engaging the latch portion of said one of said parts to effect said latch engagement, said plate fitting relatively close in the opening of the appliance for preventing lateral relative movement therebetween to hold the latch portion on the plate in substantially a fixed position relative to the latch portion of the casing, and manually operable releasing means extending from the inside of the casing to the outside thereof for releasing the said latch engagement and urging the plate out of the opening, said releasing means when manually operated forcibly engaging the plate for separating the latch engagement and urging the plate out of the casing, said releasing means being mounted on the casing and disconnected from the plate to readily facilitate the removal of the unlatched plate from the casing.

AUSTIN F. TAMS.